United States Patent Office 3,458,504
Patented July 29, 1969

3,458,504
STEROIDO[3,4-c]PYRAZOLES OF THE 5α- AND 5β-ANDROSTANE SERIES
Raymond O. Clinton, East Greenbush, N.Y., assignor to Sterling Drug Inc., New York, N.Y., a corporation of Delaware
No Drawing. Filed Oct. 24, 1966, Ser. No. 588,735
Int. Cl. C07c 173/10, 169/22; A61k 17/00
U.S. Cl. 260—239.5                    12 Claims

ABSTRACT OF THE DISCLOSURE

Steroido[3,4-c]pyrazoles of the 5α- and 5β-androstane series, having hormonal properties, are prepared by treating with hydrazine the corresponding 4-hydroxy-methylene-3-oxo-steroids. The latter intermediates are also novel compounds having hormonal properties and are prepared by formylation of 3-oxo-steroids appropriately blocked in the 2-position.

This invention relates to novel steroid compounds and in particular is concerned with androstano[3,4-c]pyrazoles, intermediates therefor and preparation thereof.

The compounds of Formula I are prepared by reacting with hydrazine a compound of the formula

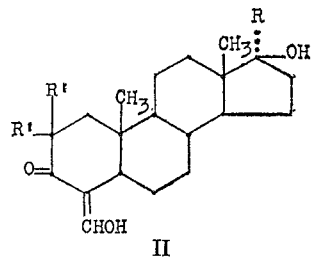

II wherein R and R' have the meanings given hereinabove, also including compounds of Formula II having a double bond in the 1,2-position, R' being hydrogen.

The compounds of Formula II are also within the purview of the invention and are in turn prepared by introducing a hydroxymethylene group into the 4-position of a corresponding 3-oxo-steroid having a double bond in the 1,2-position or two lower-alkyl groups in the 2-position which prevent reaction at the 2-position. Such starting materials are of the formulas:

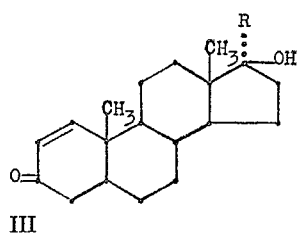 and 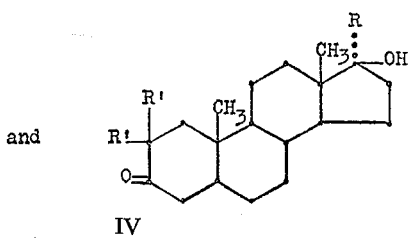

III                                    IV

The final products of the invention have the following general formula:

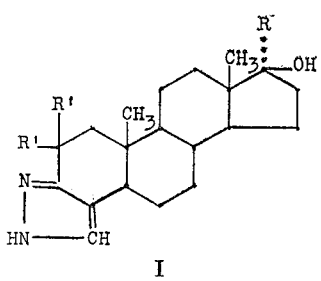

I wherein R is hydrogen, lower-alkyl or lower-alkynyl; and R' is hydrogen or lower-alkyl. Also included are compounds of the above formula having a double bond in the 1,2-position, R' being hydrogen.

In the foregoing definitions, lower-alkyl and lower-alkynyl stand for such groups having from one to about four carbon atoms.

wherein R and R' have the meanings given hereinabove.

The compounds of Formulas III and IV are treated with a lower-alkyl formate in the presence of a strong base, e.g., an alkali metal alkoxide, amide or hydride, for example sodium ethoxide, sodium amide and sodium hydride and the like, under anhydrous conditions, to give an alkali metal salt of a compound of Formula II. Acidification then gives the free enol of Formula II.

The compounds of Formulas I and II having a double bond in the 1,2-position can be hydrogenated catalytically, e.g., with palladium on carbon, to produce the corresponding compounds saturated in the 1,2-position.

The compounds of Formulas I and II can belong either to the 5α-androstane or 5β-androstane series.

The compounds of Formula I are basic in nature and thus form acid-addition salts when treated with moderate to strong inorganic or organic acids. Although pharmaceutically acceptable, water-soluble salts are preferred, all salts are useful as intermediates in the preparation of and characterizing derivatives of the free bases. These salts are the full equivalents of the corresponding free bases insofar as the physiological properties inherent in the cation are concerned. Both the free base and salt forms are considered to be one and the same invention.

The compounds of Formula II are acidic in nature and thus form salts with strong bases such as alkali metal hydroxides, alkoxides or hydrides. Illustrative salts are the sodium, potassium and calcium salts. The salts are the full equivalents of the corresponding free hydroxymethylene compounds insofar as their physiological properties are concerned and their utility as intermediates.

The structures of the compounds of the invention were established by the modes of synthesis, by elementary analysis and by ultraviolet and infrared spectral data.

Endocrinological evaluation of the compounds of Formula I has shown that they possess useful harmonal properties; in particular they are useful as estrogenic, progestational and hypocholesteremic agents. They are effective at dose levels of 10–50 mg./kg. when administered subcutaneously or orally, and are prepared for use in the manner by which steroidal hormones are conventionally formulated.

The compounds of Formula II are not only useful as intermediates in the preparation of the compounds of Formula I, but have been shown by endocrinological evaluation to have useful hormonal properties, in particular pituitary inhibiting and anabolic activities. They are effective at dose levels of 2–30 mg./kg. when administered subcutaneously or orally, and are prepared for use in the manner by which steroidal hormones are conventionally formulated.

The following examples will further illustrate the invention without the latter being limited thereby.

EXAMPLE 1

(a) 4-hydroxymethylene-17α-methyl-5α-androsten-17β-ol-3-one [II; R is $CH_3$, R′ is H, $\Delta^1$, 5α-H].—To a solution of 42.0 g. of 17β-hydroxy-17α-methyl-5α-1-androsten-3-one (M.P. 152–154° C. when recrystallized from acetone-hexane) in 300 ml. of pyridine was added 30.0 g. of sodium methoxide, 100 ml. of pyridine and 40 ml. of ethyl formate. The reaction mixture was stirred under nitrogen for a few minutes and allowed to stand at room temperature under nitrogen for two days. Ice-water was then added followed by an excess of concentrated hydrochloric acid. The product was extracted with methylene dichloride, and the methylene dichloride extracts were washed with water and with 2 liters of 0.4 N sodium hydroxide. The solid sodium salt which formed was collected by filtration, washed with water, and added to 500 ml. of 2 N hydrochloric acid. The acid product was extracted with ether and the ether extracts washed with 200 ml. of 5% sodium bicarbonate solution and 200 ml. of saturated sodium chloride solution dried over anhydrous magnesium sulfate and concentrated to about 50 ml. There separated 28.65 g. of 4-hydroxymethylene-17α-methyl-5α-1-androsten-17β-ol-3-one. M.P. 138–140° C. A sample when recrystallized from acetonitrile was obtained in the form of colorless needles, M.P. 139–141° C.; $[\alpha]_D^{25}=+132.0°$ (1% in chloroform).

(b) 17β - hydroxy-17α-methyl-5α-1-androsteno[3,4-c]pyrazole [I; R is $CH_3$, R′ is H, $\Delta^1$, 5α-H].—To a solution of 1.24 g. of 4-hydroxymethylene-17α-methyl-5α-1-androsten-17β-ol-3-one in 20 ml. of ethanol was added 0.21 g. of hydrazine hydrate. The reaction mixture was refluxed for two hours and then concentrated by distillation on a steam bath. Water was added to the residue, and the product was collected by filtration, washed with water and dried to give 1.20 g. of 17β-hydroxy-17α-methyl-5α-1-androsteno[3,4-c]pyrazole, M.P. 247.4–257.4° C. when recrystallized from an ethanol-methanol mixture.

EXAMPLE 2

(a) 4 - hydroxymethylene-2,2,17α-trimethyl-5α-androstan-17β-ol-3-one [II; R and R′ are $CH_3$, 5α-H] was prepared from 3.32 g. of 2,2,17α-trimethyl-5α-androstan-17β-ol-3-one (M.P. 112–114° C. when recrystallized from pentane-ether), sodium methoxide (from 0.5 g. of sodium) and 7 ml. of ethyl formate in 50 ml. of pyridine according to the procedure described above in Example 1, part (a). There was thus obtained 1.23 g. of 4-hydroxymethylene-2,2,17α-trimethyl-5α-androstan - 17β - ol-3-one, M.P. 164–170° C.

(b) 17β - hydroxy-2,2,17α-trimethyl-5α-androstano[3,4-c]pyrazole [I; R and R′ are $CH_3$, 5α-H] was prepared from 1.12 g. of 4-hydroxymethylene-2,2,17α-trimethyl-5α-androstan-17β-ol-3-one and 0.17 g. of hydrazine hydrate in ethanol according to the procedure described above in Example 1, part (b). The product was recrystallized from ether to give 17β-hydroxy-2,2,17α-trimethyl-5α-androstano[3,4-c]pyrazole, M.P. 255.6–264.6° C., $[\alpha]_D^{25}=+15.9°$ (1% in pyridine).

EXAMPLE 3

(a) 4-hydroxymethylene - 17α - methyl-5α-androstan-17β-ol-3-one [II; R is $CH_3$, R′ is H, 5α-H].—A solution of 6.60 g. of 4-hydroxymethylene-17α-methyl-5α-1-androsten-17β-ol-3-one (Example 1a) in 300 ml. of ethanol was hydrogenated in the presence of 0.50 g. of 10% palladium on carbon catalyst. After the uptake of hydrogen had ceased, the reaction mixture was filtered and the solvent removed by distillation. The residue was recrystallized from acetonitrile to give 4-hydroxymethylene-17α-methyl-5α-androstan-17β-ol-3-one, colorless prisms, M.P. 146–147° C.; $[\alpha]_D^{25}=+25.1°$ (1% in chloroform).

(b) 17β-hydroxy-17α-methyl - 5α - androstano[3,4-c]pyrazole [I; R is $CH_3$, R′ is H, 5α-H] was prepared by catalytic hydrogenation of 2.44 g. of 17β-hydroxy-17α-methyl-5α-1-androsteno[3,4-c]pyrazole (Example 1b) according to the procedure of Example 3(a) above. There was obtained 1.77 g. of 17β-hydroxy-17α-methyl-5α-androstano[3,4-c]pyrazole, M.P. 259–269° C. A sample when recrystallized from an ethanol-methanol mixture had the M.P. 264.2–272.4° C.; $[\alpha]_D^{25}=-7.4°$ (1% in chloroform).

17β-hydroxy - 17α - methyl-5α-androstano[3,4-c]pyrazole can also be obtained by treating 4-hydroxymethylene-17α-methyl-5α-androstan-17β-ol-3-one with hydrazine according to the procedure of Example 1, part (b).

EXAMPLE 4

(a) 4 - hydroxymethylene-5β-1-androsten-17β-ol-3-one [II; R and R′ are H, $\Delta^1$, 5β-H].—A solution of 5.25 g. of 5β-1-androsten-17β-ol-3-one (M.P. 199–202° C., colorless rods from ethyl acetate-hexane) in 400 ml. of benzene was distilled under nitrogen until 100 ml. of solvent had been removed. The solution was cooled to room temperature, and 5 ml. of ethyl formate and 2.00 g. of sodium methoxide were added. The reaction mixture was stirred under nitrogen for 30 minutes and kept at room temperature under nitrogen for 44 hours. The solid product was collected, washed with ether and suspended in water. To the suspension 1 liter of cold water containing 10 ml. of acetic acid was added. The product was collected by filtration, washed with water and dried to give 5.3 g. of 4-hydroxymethylene-5β-1-androsten-17β-ol-3-one, M.P. 122–127° C. Repeated recrystallization from aqueous ethanol gave a sample in the form of pale yellow needles, M.P. 151–152° C.; $[\alpha]_D^{25}=+131.4°$ (1% in chloroform).

(b) 17β - hydroxy - 5β-1-androsteno[3,4-c]pyrazole [I; R and R′ are H, $\Delta^1$, 5β-H].—A mixture of 1.297 g. of 4-hydroxymethylene-5β-1-androsten-17β-ol-3-one, 1 ml. of hydrazine hydrate, 50 ml. of tetrahydrofuran and 10 ml. of ethanol was heated to boiling on a steam bath. The reaction mixture was kept at room temperature for 90 hours, and the solvent was then removed in vacuo. The residue was recrystallized from aqueous ethanol to give 1.17 g. of 17β-hydroxy-5β-1-androsteno[3,4-c]pyrazole, M.P. 263–266° C. Further recrystallization gave a sample in the form of pale yellow crystals, M.P. 267.6–268.4° C.; $[\alpha]_D^{25}=+91°$ (1% in ethanol).

(c) 17β - hydroxy - 5β - androstano[3,4 - c]pyrazole [I; R and R′ are H, 5β-H] can be prepared by catalytic hydrogenation of 17β-hydroxy-5β-1-androsteno[3,4-c]pyrazole by the procedure of Example 3.

EXAMPLE 5

(a) 4-hydroxymethylene-5α-1-androsten-17β-ol-3-one [II; R and R' are H, Δ¹, 5α-H] was prepared from 20.0 g. of 5α-1-androsten-17β-ol-3-one (M.P. 152–156° C.) and sodium methoxide (from 4.6 g. of sodium) in methanol-pyridine solution according to the procedure of Example 1, part (a). The product was recrystallized from aqueous acetonitrile to give 4-hydroxymethylene-5α-1-androsten-17β-ol-3-one, M.P. 152.6–154.8° C.; $[\alpha]_D^{25} = +161.8°$ (1% in chloroform).

(b) 17β-hydroxy-5α-1-androsteno[3,4-c]pyrazole [I; R and R' are H, Δ¹, 5α-H] can be prepared by treating 4-hydroxymethylene-5α-1-androsten-17β-ol-3-one with hydrazine according to the procedure of Example 1, part (b).

(c) 17β-hydroxy-5α-androstano[3,4-c]pyrazole [I; R and $R_2$ are H, 5α-H] can be prepared by catalytic hydrogenation of 17β-hydroxy-5α-1-androsteno[3,4-c]pyrazole by the procedure of Example 3.

EXAMPLE 6

(a) 4-hydroxymethylene-17α-ethynyl-5α-1-androsten 17β-ol-3-one [II; R is C≡CH, R' is H, Δ¹, 5α-H] can be prepared by treating 17α-ethynyl-5α-1-androsten-17β-ol-3-one with ethyl formate and sodium methoxide according to the procedure of Example 1, part (a).

17α-ethynyl-5α-1-androsten-17β-ol-3-one can be prepared as follows: 5α-1-androsten-17β-ol-3-one with ethylene glycol as p-toluenesulfonic acid gives the 3-ethylene glycol ketal. The latter can be oxidized with chromic acid in pyridine to give 5α-1-androstene-3,17-dione 3-monoethylene glycol ketal, which can then be ethynylated with ethynyllithium to afford 17α-ethynyl-5α-1-androsten-17β-ol-3-one 3-ethylene glycol ketal. Removal of the ketal group with acid then gives the desired 17α-ethynyl-5α-1-androsten-17β-ol-3-one.

(b) 17β-hydroxy-17α-ethynyl-5α-1-androsteno[3,4-c]pyrazole [I; R is C≡CH, R' is H, Δ¹, 5α-H] can be prepared by treating 4-hydroxymethylene-17α-ethynyl-5α-1-androsten-17β-ol-3-one with hydrazine according to the procedure of Example 1, part (b).

EXAMPLE 7

(a) 4-hydroxymethylene-2,2-dimethyl-17α-ethynyl-5α-androstan-17β-ol-3-one [II; R is C≡CH, R' is CH₃, 5α-H] can be prepared as follows: 2,2-dimethyl-5α-androstan-17β-ol-3-one is converted to its 3-ethylene glycol ketal and the latter oxidized with chromic oxide to the 3-ketal of 2,2-dimethyl-5α-androstane-3,17-dione, which is then ethynylated with ethynyllithium to give the 3-ketal of 2,2-dimethyl-17α-ethynyl-5α-androstan-17β-ol-3-one. Acid cleavage of the ketal followed by reaction with ethyl formate and sodium methoxide according to the procedure of Example 1, part (a), gives the desired 4-hydroxymethylene-2,2-dimethyl-17α-ethynyl-5α-androstan-17β-ol-3-one.

(b) 17β-hydroxy-2,2-dimethyl-17α-ethynyl-5α-androstano[3,4-c]pyrazole [I; R is C≡CH, R' is CH₃, 5α-H] can be prepared by treating 4-hydroxymethylene-2,2-dimethyl-17α-ethynyl-5α-androstan-17β-ol-3-one with hydrazine according to the procedure of Example 1, part (b).

EXAMPLE 8

17β-hydroxy-5α-androstano[3,4-c]pyrazole (Example 5c) when treated with cyanic acid (potassium cyanate and hydrochloric acid) is converted to 17β-hydroxy-5α-androstano[3,4-c]pyrazole-N-carboxamide. The latter with chromic oxide in acetic acid solution is oxidized to 17-oxo-5α-androstano[3,4-c]pyrazole-N-carboxamide, which when heated with ethanolic hydrogen chloride is converted to 17-oxo-5α-androstano[3,4-c]pyrazole. 17-oxo-5α-androstano[3,4-c]pyrazole can be caused to react with an alkali metal acetylide to afford 17β-hydroxy-17α-ethynyl-5α-androstano[3,4-c]pyrazole [I; R is C≡CH, R' is H, 5α-H].

I claim:

1. (A) A compound of the formula

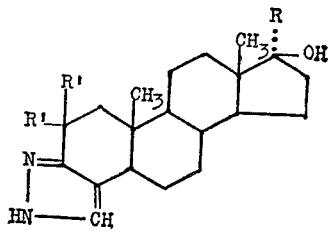

wherein R is hydrogen, lower-alkyl or lower-alkynyl; and R' is hydrogen or lower-alkyl; or (B) A compound of the above formula having a double bond in the 1,2-position, R' being hydrogen.

2. A compound according to claim 1 wherein R is hydrogen or methyl.

3. 17β-hydroxy-17α-methyl-5α-1-androsteno[3,4-c]pyrazole, according to claim 2 wherein R is methyl and R' is hydrogen, and there is a double bond in the 1,2-position.

4. 17β-hydroxy-2,2,17α-trimethyl-5α-androstano[3,4-c]pyrazole, according to claim 2 wherein R and R' are methyl.

5. 17β-hydroxy-17α-methyl-5α-androstano[3,4-c]pyrazole, according to claim 2 wherein R is methyl and R' is hydrogen.

6. 17β-hydroxy-5β-1-androsteno[3,4-c]pyrazole, according to claim 2 wherein R and R' are hydrogen, and there is a double bond in the 1,2-position.

7. (A) A compound of the formula

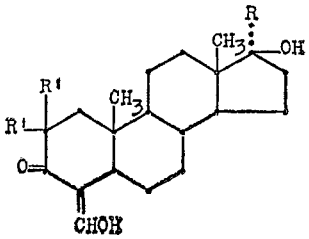

wherein R is hydrogen, lower-alkyl or lower-alkynyl; and R' is lower-alkyl; or (B) a compound of the above formula having a double bond in the 1,2-position, R' being hydrogen.

8. A compound according to claim 7 wherein R is hydrogen or methyl.

9. 17β-hydroxy-4-hydroxymethylene-17α-methyl-5α-1-androsten-3-one, according to claim 8 wherein R is methyl and R' is hydrogen, and there is a double bond in the 1,2-position.

10. 17β-hydroxy-4-hydroxymethylene-2,2,17α-trimethyl-5α-androstan-3-one, according to claim 8 wherein R and R' are methyl.

11. 17β-hydroxy-4-hydroxymethylene-5β-1-androsten-3-one, according to claim 8 wherein R and R' are hydrogen, and there is a double bond in the 1,2-position.

12. 17β-hydroxy-4-hydroxymethylene-5α-1-androsten-3-one, according to claim 8 wherein R and R' are hydrogen, and there is a double bond in the 1,2-position.

References Cited

Clinton et al., Chem. & Ind. pp. 2099–2100 (1961).
Clinton et al., J. Org. Chem. 27 pp. 2800–01 (1962).
Sciaky et al., Tetrahedron Letters No. 28, pp. 1839–40 (1964).

HENRY A. FRENCH, Primary Examiner

U.S. Cl. X.R.

260—239.55, 397.4, 999

PO-1050
(5/69)

UNITED STATES PATENT OFFICE
CERTIFICATE OF CORRECTION

Patent No. 3,458,504    Dated July 29, 1969

Inventor(s) Raymond O. Clinton

It is certified that error appears in the above-identified patent and that said Letters Patent are hereby corrected as shown below:

Column 3, line 8, "harmonal" should read --hormonal--; line 28, "5α-androsten-" should read --5α-1-androsten- --. Column 5, line 17, "$R_2$" should read --R'--; line 30, "glycol as" should read --glycol and--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents